INVENTORS
John A. Rado
BY
ATTORNEYS

INVENTORS
John A. Rado

BY
ATTORNEYS

Nov. 15, 1966 J. A. RADO 3,286,085
MACHINE TOOL FEEDRATE CONTROL SYSTEM
Filed Jan. 23, 1963 6 Sheets-Sheet 5

INVENTORS
John A. Rado
BY
ATTORNEYS

United States Patent Office 3,286,085
Patented Nov. 15, 1966

3,286,085
MACHINE TOOL FEEDRATE CONTROL SYSTEM
John A. Rado, Michigan City, Ind., assignor to
TWR Inc., a corporation of Ohio
Filed Jan. 23, 1963, Ser. No. 253,411
2 Claims. (Cl. 235—151.11)

This invention was evolved with the general object of providing an improved feedrate control arrangement for an automatic machine tool control system. The control arrangement of this invention has other applications but was particularly designed for a system of the type in which servo systems are controlled in accordance with a block of information on a section of punched tape, to move a machine tool element a certain distance along each of a plurality of mutually perpendicular axes, in a certain interval of time. Such movements may be obtained by punching holes at appropriate positions in one section of a block of tape fed to a tape reader. Another section or block of tape may then control movement of the machine tool element along a certain path to a new position.

In such systems, the speed of movement is determined by the square root of the sum of the squares of the movements along the mutually perpendicular axes, divided by the interval of time in which such movements are accomplished, so that the programmed time may be selected to control speed. However, the speed could not be controlled accurately and the programming operation would be time-consuming.

To overcome such disadvantages, it has heretofore been proposed to provide a system wherein a constant speed of movement or feedrate may be programmed and maintained independently of the programming of the path of movement. In such a system as heretofore proposed, command pulse trains are converted to analog signals which are summed and applied to a square root circuit, the output of the square root circuit being compared with a feedrate signal derived from programmed information, and being used to control a variable frequency oscillator. Such a system is quite satisfactory in many applications but has limitations with respect to accuracy, particularly where the programmed distance of movement and programmed feedrates vary over wide ranges, which is generally the case in practice.

According to an important feature of this invention, the speeds of movement of parts along mutually perpendicular axes are controlled from a variable frequency oscillator which is controlled in response to a comparison of two pulse trains, the first pulse train being a feedback pulse train at a rate proportional to the speed of movement of a controlled element, and the second pulse train being a feedrate command pulse train, the oscillator being so controlled as to maintain such first and second pulse trains at the same rate. By so controlling the oscillator in response to pulse trains, rather than analog signals, it is possible to obtain a high degree of accuracy over a wide range of operating conditions.

According to another important feature, the feedback pulse train is proportional to the speed of movement along the largest axis, i.e. an axis in which the amount of programmed movement is greater than, or at least equal to, the amount of programmed movement along any other axis.

In accordance with a further feature of the invention, the feedrate command pulse train is generated at a rate proportional to a feedrate number multiplied by a value proportional to the speed of movement along the largest axis and inversely proportional to the square root of the sum of the squares of the speeds of movement along mutually perpendicular axes. With this arrangement, and with the first pulse train being proportional to the rate of movement along the largest axis, the speed is accurately controlled.

Still another feature of the invention relates to the generation of normalized analog speed signals each proportional to the ratio of the speed of movement along one axis to the speed of movement along the largest axis.

A still further feature relates to the generation of a reference signal at a frequency proportional to the speed of movement along the largest axis and inversely proportional to the square root of the sum of the squares of the speeds along mutually perpendicular axes. Preferably, such a signal is generated by a variable frequency oscillator operated in response to the normalized analog signals, and the reference signal is multiplied by a feedrate number to develop the feedrate command signal.

Another very important feature of the invention relates to zero detection circuitry usable by itself to reduce speed variations and usable in connection with other circuits to reduce the range of values to be handled by the circuits and to greatly increase accuracy.

Additional features of the invention relate to particular circuit arrangements which make the system more accurate, reliable and flexible in operation with pure and less expensive components.

These and other objects, features and advantages will become more fully apparent from the following detailed description taken in conjunction with the accompanying drawings which illustrate a preferred embodiment and in which.

Figure 1:
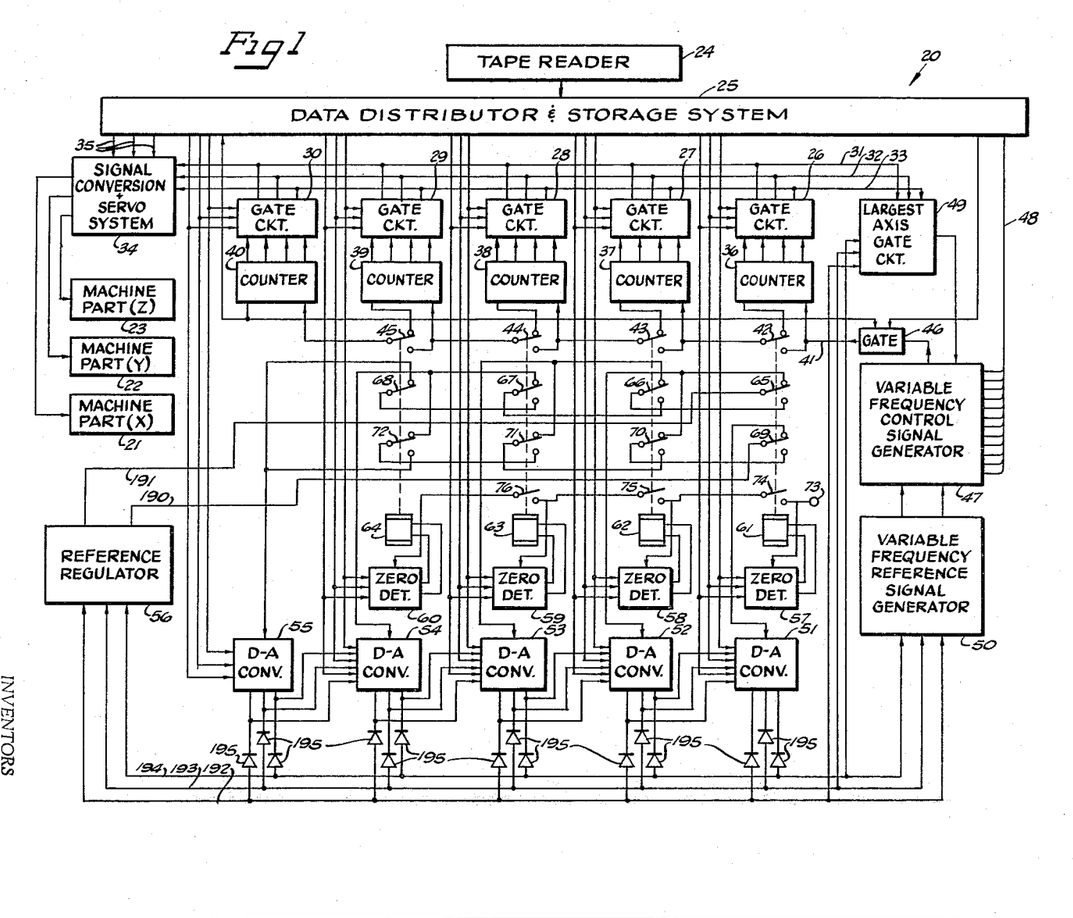
FIGURE 1 is a block diagram of an automatic machine tool control system constructed according to this invention.

Reference numeral 20 generally designates a system constructed according to this invention, arranged to control the movement of three machine parts 21, 22 and 23 preferably operative to cause relative movement between a cutter and a workpiece in three mutually perpendicular directions.

In general, the system 20 comprises a tape reader 24 which reads a block of information from punched tape and supplies it to a data distributor and storage system 25. The system 25 develops signals which control the amount of movement of the machine parts 21–23 and also control the rates of movement of the parts, through a feedrate control system constructed according to the invention.

In particular, the system 25 has five groups of output lines, three axis lines in each group, connected to gating circuits 26–30 which respectively correspond to digits of five-digit control signals, the circuit 26 corresponding to the most significant digits with the circuit 30 corresponding to the least significant digits.

Through the gating circuits 26–30, x, y and z command pulse trains are generated on lines 31, 32 and 33 connected to a signal conversion and servo system 34, which operates to move the machine parts 21–23 in proportion to the number of command pulses on the lines 31–33. For example, each command pulse may cause movement of the corresponding part through a distance of 0.0001 inch. The direction of movement is controlled by sign information applied through lines 35 from the data distributor and storage system 25.

The manner of generation of the command pulse train is not new, by itself, but is important to the operation of the feedrate control system of this invention. In particular, to generate the command pulse trains on the lines 31–33, the gating circuits 26–30 are supplied with pulses from five decade counters 36–40 connected in cascade. Input pulses are usually applied to the first counter 36 from a line 41, but may be advantageously applied through relay contacts 42, 43, 44 and/or 45 to the inputs of counters 37–40, under control of zero detection circuitry forming an important feature of the invention and described in detail hereinbelow.

In the usual operation, with input pulses applied to the first counter 36, the counter chain completes a cycle of operation in response to 100,000 input pulses, and an end carry pulse is then developed by the final counter 40 and is applied to close a gate 46 to discontinue application of pulses to line 41. The end carry pulse is also applied to the data distributor and storage system which may immediately reopen the gate 46 to initiate another cycle of operation.

In the illustrated system, each counter 36–40 may develop a series of pulses with the numbers of pulses in the series being selectively addable to produce any number from 1 through 9 and with the pulses of each series being noncoincident with the pulses of each of the other series. Preferably, a 5,2,1,1 code is used. Thus by control of gates in the circuits 26–30, trains of command pulses can be generated with the number of pulses in each train being from 1 to 99,999 and being distributed substantially uniformly over the cycle of operation. It is noteworthy that the rate of frequency of generation of the command pulses on each of the x, y and z lines 31–33 is proportional to the rate or frequency of application of pulses on the line 41, and the frequency of pulses on line 41 can be changed as desired to cause a simultaneous change in the rates of the command pulses, and hence in the relative rate of movement along the three mutually perpendicular axes.

To apply a signal of the proper frequency through gate 46 to the line 41 and thereby control the speeds of movement of the machine parts 21–23, a variable frequency control signal generator 47 is provided which responds to three signals. The first signal is a digital feedrate signal applied through a twelve conductor cable 48 from the data distributor and control system 25; the second signal is a feedback pulse signal applied through a largest axis gate circuit from the one of the lines 31–33 having the highest pulse rate; and the third signal is a variable frequency pulse signal applied from a variable frequency reference signal generator 50.

In brief, the generator 47 applies a signal to the gate 46 at a frequency such that the frequency of the largest axis signal from circuit 49 is equal to the frequency of the signal from the reference signal generator 50, multiplied by a feedrate number applied through the cable 48.

The reference signal generator 50 responds to the output of five digital-analog convertors 51–55 having inputs connected to the same five groups of data lines which are connected to the gate circuits 26–30, to thereby respond to digital incremental distance signals. The digital-analog convertors 51–55 also have inputs connectable through relay contacts of the zero detection circuitry to a reference regulator 56. In brief, the digital-analog convertors 51–55 function to develop three "normalized" analog axis signals each proportional to the programmed incremental distance along the corresponding axis, divided by the velocity along the largest axis. The reference signal generator 50, in turn, responds to such normalized analog signals to generate a reference signal at a frequency equal to a fixed value divided by the square root of the sum of the squares of the three normalized analog signals.

As a result of the combined operation of the circuits, the feedrate numbers applied through the cable 48 and the incremental distance signals can be varied over extremely wide ranges of values, but the system always functions to maintain the vector sum of the speed of movements of the parts 21–23 equal to the feedrate number information, with a high degree of accuracy.

The zero detection circuitry constitutes an important feature of the invention by itself and will be first described because its operation is interrelated with the operation of other circuits. In general, the zero detection circuitry operates to speed up operation of the system under circumstances when otherwise it would be very slow, which is highly advantageous by itself and is particularly advantageous in connection with other circuits of this invention in reducing the range of signal values to be handled by the circuits. The zero detection circuitry also controls application of reference signals to the digital-analog convertors to reduce the range of values to be applied to and handled by the convertors and to obtain highly accurate and reliable operation thereof.

In particular, four zero detection circuits 57–60 are provided having inputs connected to the x, y and z data lines corresponding to the four most significant digits, and having outputs connected to relay coils 61–64. The relay coils 61–64 are energizable to actuate the contacts 42–45 and also second and third groups of contacts 65–68 and 69–72.

In operation, a signal is applied from a power supply terminal 73 to the first zero detection circuit 57. If a zero is programmed as a first digit in all three axes, the first detector 57 energizes the relay 61 thereby actuating the contact 42 to apply control pulses to the second decade counter 37, bypassing the first counter 36. Contacts 65 and 69 are also actuated to control application of signals to the digital-analog converters in a manner described hereinbelow. With control pulses applied to the second counter 37 rather than the first counter 36, the command pulse generating system is operated at a speed equal to ten times what it otherwise would be, without loss of accuracy. Conversely, if speed is assumed to be constant, the rate at which pulses must be applied is reduced to one-tenth what it would otherwise be.

When the first relay 61 is energized, an enabling voltage is applied from terminal 73 through a contact 74 to the second zero detector 58, and if a zero is also programmed as a second digit in all three axes, the relay 62 is energized to actuate contacts 43, 66 and 70, and to also close a contact 75 to apply the enabling voltage to the third zero detector 59. If a zero is also programmed as a third digit in all three axes (as well as the first and second digits) the third relay 63 is energized to actuate contacts 44, 67 and 71 and to also close a contact 76 to apply an enabling voltage to the fourth zero detector 60. If a zero is programmed as a fourth digit in all three axes, the relay 64 is energized to close contacts 45, 68 and 72.

Accordingly, the programmed incremental distance to be moved may be reduced as desired and the system limits the maximum ratio of the rate of control pulses to the rate of movement of the controlled parts.

Figures 2, 3:
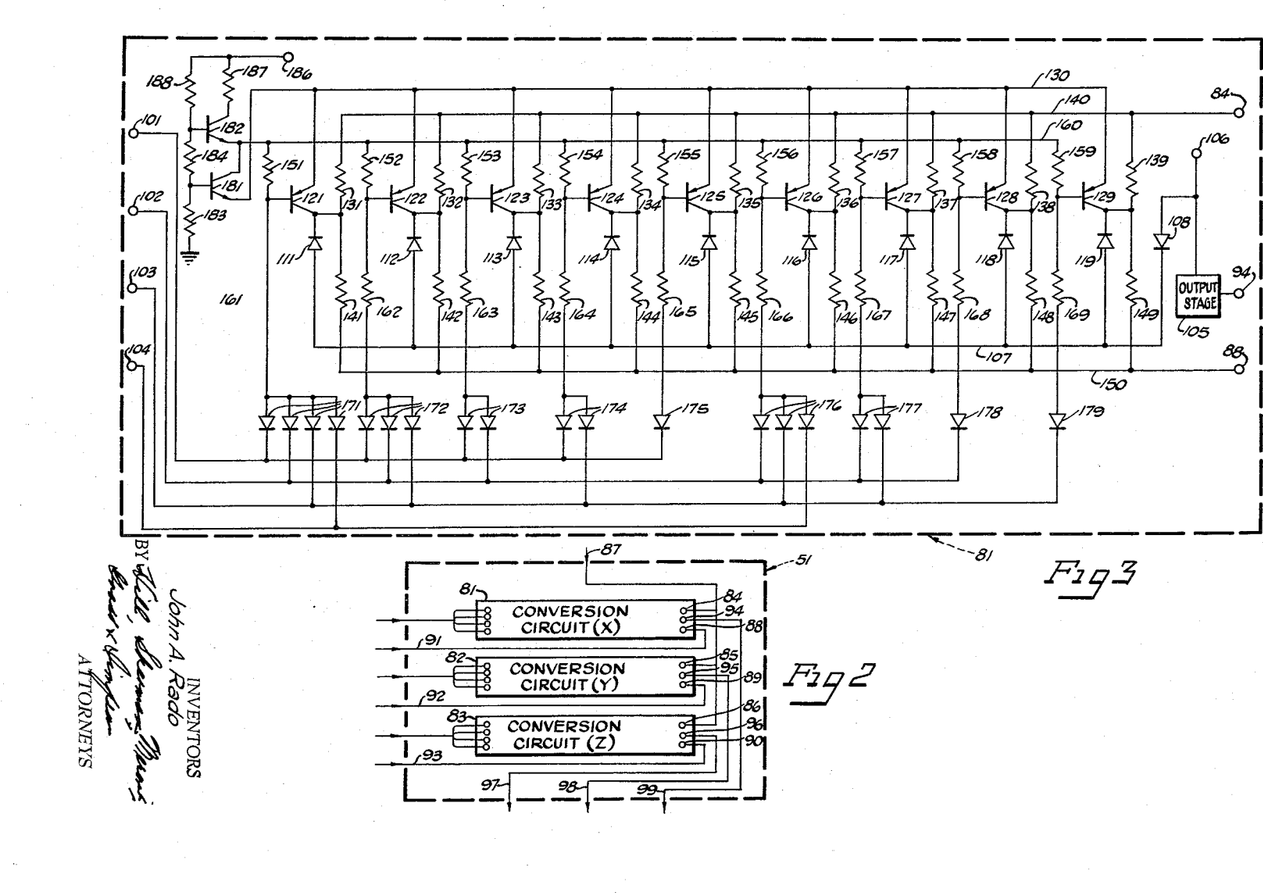
FIGURE 2 is a block diagram of a digital-to-analog convertor of the system of FIGURE 1.
FIGURE 3 is a circuit diagram of one of three conversion circuits of the convertor of FIGURE 2.

FIGURE 2 is a block diagram of the digital-analog convertor 51, the circuits of the other convertors 52–55 being the same. As shown, three conversion circuits 81, 82 and 83 are provided, one for each axis, each having four input terminals which are connected to the data lines from the data distributor and storage system 25. The circuits 81–83 have input terminals 84–86 connected to a line 87 to receive a reference voltage signal from the reference regulator 56, through the zero detection relay contact circuitry. Additional input terminals 88–90 are connected through lines 91 and 92 to the outputs of the digital-analog convertors for the next less significant digit. Output terminals 94–96 are connected to lines 97–99 for connection to inputs of the largest axis gate circuit 49, the reference signal generator 50 and the reference regulator 56.

FIGURE 3 is a circuit diagram of the conversion circuit 81, which is identical to the circuits 82 and 83, as well as to the circuits of the other digital-analog convertors 52–55. In general, the circuit response to input digital data signals applied to four input terminals 101–104, to a modifying signal applied to terminal 88 from an output of a corresponding circuit for the same axis but of the next lower significant digit, and to a reference signal applied to line 87, and the circuit functions to develop a "normalized" analog output at terminal 94 proportional to the programmed incremental distance divided by the velocity along the largest axis.

The outpt terminal 94 is connected to an output terminal of an output stage 105 having a supply voltage input terminal connected to a negative power supply terminal 106 and having an input terminal connected to a line 107 with a diode 108 connected between line 107 and the terminal 106. Line 107 is connected through diodes 111–119 to the collectors of transistors 121–129, the emitters of which are connected to a line 130. The collectors of transistors 121–129 are also connected through resistors 131–139 to a line 140 connected to the input terminal 84 and through resistors 141–149 to a line 150 connected to the input terminal 88. The base electrodes of the transistors 121–129 are connected through resistors 151–159 to a line 160 and are also connected to terminals of a series of resistors 161–169, the other terminals of the resistors 161–169 being connected respectively through four diodes 171 to all four input terminals 101–104, through diodes 172 to input terminals 101–103, through diodes 173 to input terminals 101 and 102, through diodes 174 to input terminals 101 and 103, through a diode 175 to input terminal 101, through diodes 176 to input terminals 102–104, through diodes 177 to input terminals 102 and 103, through a diode 178 to input terminal 102 and through a diode 179 to input terminal 103.

Regulated voltages, preferably +4 and +8 volts are respectively applied to lines 130 and 160 through a pair of transistors 181 and 182 having emitters respectively connected to the lines 130 and 160 with the collector of transistor 181 also connected to the line 130. The base of the transistor 181 is connected through a resistor 183 to ground and through a resistor 184 to the base of transistor 183 which is connected through a resistor 185 to a positive power supply terminal 186, a resistor being connected between terminal 186 and the collector of transistor 182.

The digital-analog conversion circuit 81 of FIGURE 3 is designed for operation on a 5,2,1,1' code, the "5" line being connected to terminal 101, the "2" line being connected to terminal 102, and the "1" and "1'" lines being connected to terminals 103 and 104. The transistors 121–129 operate essentially as switches to produce predetermined outputs related in integers of one through nine, the output from transistor 128 being twice that from transistor 129, the output from transistor 127 being three times that from transistor 129, and so on, the output from transistor 121 being nine times that from transistor 129. This relationship is determined by the values of resistors 131–139 and 141–149, resistors 131–139 preferably having resistances of 10K–90K respectively while resistors 141–149 have resistances of 90K–10K respectively. Resistors 151–159 may preferably have resistances of 39K while resistors 161–169 have resistances of 10K.

The analog output voltage is controlled also in response to the reference voltage applied to terminal 84 and the modifying voltage applied to terminal 88. As described hereinbelow, the reference voltage 84 is so controlled as to make the "largest axis" output voltage equal to a certain value, to "normalize" the output voltage. The modifying voltage applied to terminal 88 is obtained from the output of a corresponding circuit for the same axis, but of the next lower significant digit, while a reference voltage is applied to that circuit equal to one-tenth the voltage applied to terminal 84. In this way the output voltage is properly controlled by the two most significant digits and a corresponding degree of accuracy is obtained.

Figure 4:
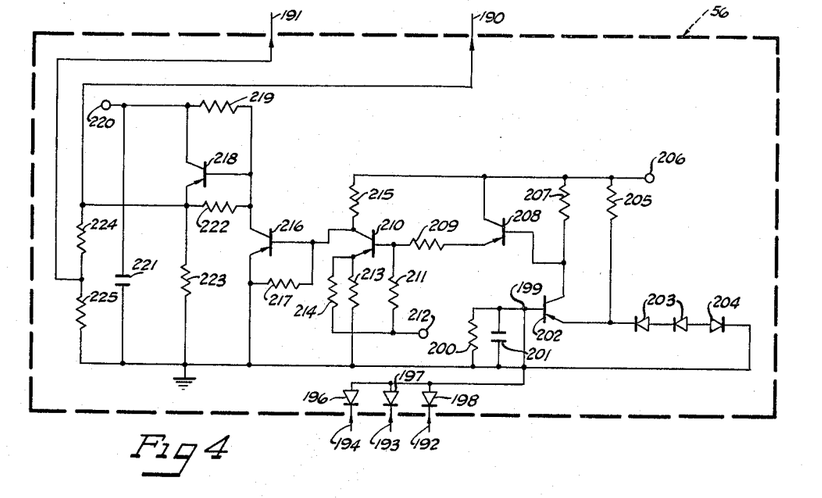
FIGURE 4 is a circuit diagram of a reference regulator circuit of the system of FIGURE 1.

FIGURE 4 shows the circuit of the reference regulator 56 which operates to supply reference signals on output lines 190 and 191 having values such as to maintain the "largest axis" output signal from the digital-analog converters 51–55 equal to a certain value, preferably about 7 volts to thus "normalize" the outputs of the digital-analog convertors 51–55. Output signals from the convertors 51–55 are applied to the regulator 56 on lines 192, 193 and 194, it being here noted that isolation diodes 195 are connected between the lines 192–194 and the outputs of the convertors 51–55 so that only the signal of largest amplitude (and of negative polarity with the illustrated circuit) are applied on lines 192–194.

The reference regulator 56 operates to develop a voltage on line 191 equal to 0.1 that developed on line 190. With reference to FIGURE 1, it will be noted that line 190 is normally connected through relay contact 69 to the convertor 51 for the most significant digit, while line 191 is connected through contact 65 to the convertor 52 for the next most significant digit, thereby applying a reference voltage to convertor 52 equal to 0.1 that applied to the convertor 51. If the most significant digit in all three axes is a 0, the relay 61 is energized to connect the lines 190 and 191 to the convertors 52 and 53 through contacts 69, 70 and 65, 66. Similarly, if the two most significant digits in all axes are zeros, the lines 190 and 191 are connected to convertors 53 and 54 through contacts 69–71 and 65–67; if the three most significant digits in all axes are zeros, the lines 190 and 191 are connected through two convertors 54 and 55 through contacts 69–72 and 65–68; and if the four most significant digits are zeros, the line 190 is connected to the convertor 55 through contacts 69–73, line 191 being not used in this instance.

By way of example, the voltage output of the "largest axis" line from the digital-analog convertor may be maintained equal to about 7.2 volts and the voltage of the line 190 may have any value from 10/9.9 times 7.2 to 10/1 times 7.2 in order to obtain the required output voltage.

As shown in FIGURE 4, the lines 192–194 are connected through isolation diodes 196–198 to a circuit point 199 connected to ground through the parallel combination of a resistor 200 and a capacitor 201, a voltage being thus developed at circuit point 199 equal to the "largest axis" voltage output of the digital-analog convertors. Circuit point 199 is connected to the base of a transistor 202 the emitter of which is connected through a pair of diodes 203 and a zener diode 204 to ground and also through a resistor 205 to a negative power supply terminal 206. The collector of transistor 202 is connected through a resistor 207 to the terminal 206 and is also connected to the base of a transistor 208. The collector of transistor 208 is connected to the terminal 206 while the emitter thereof is connected through a resistor 209 to the base of a transistor 210 connected through a resistor 211 to a positive power supply terminal 212. The emitter of the transistor 210 is connected through a resistor 213 to ground and through a resistor 214 to the positive power supply terminal 212. The collector of transistor 210 is connected through a resistor 215 to the negative power supply terminal 206 and is also connected directly to the base of a transistor 216 and through a resistor 217 to the emitter of the transistor 216 which is connected to ground. The collector of the transistor 216 is connected to the base of a transistor 218, and through a resistor 219 to a negative power supply terminal 220 connected through a capacitor 221 to ground. The emitter of the transistor 218 is connected through a resistor 222 to the base thereof and through a resistor 223 to ground, and is also connected to the output line 190.

A voltage divider is connected between line 190 and ground in the form of a pair of resistors 224 and 225, the junction between the resistors being connected to the line 191. The resistors 224 and 225 preferably have values such that the voltage at line 191 is equal to 0.1 that of the line 190.

In operation, if the voltage at circuit point 190 becomes more negative than the negative voltage at the emitter of transistor 202, the transistor 202 conducts to move the potential of the base of transistor 208 in a positive direction, thereby moving the potential of the base of the transistor 210 in a positive direction to move the potential of the base of transistor 216 in a negative direction to decrease the voltage of the line 190. The effect is opposite, of course, if the voltage at circuit point 199 becomes less negative than the regulated voltage at the emitter of transistor 202. As a result, a regulating action is obtained by which the "largest axis" voltage is maintained substantially constant, thereby normalizing the values.

Figure 5:
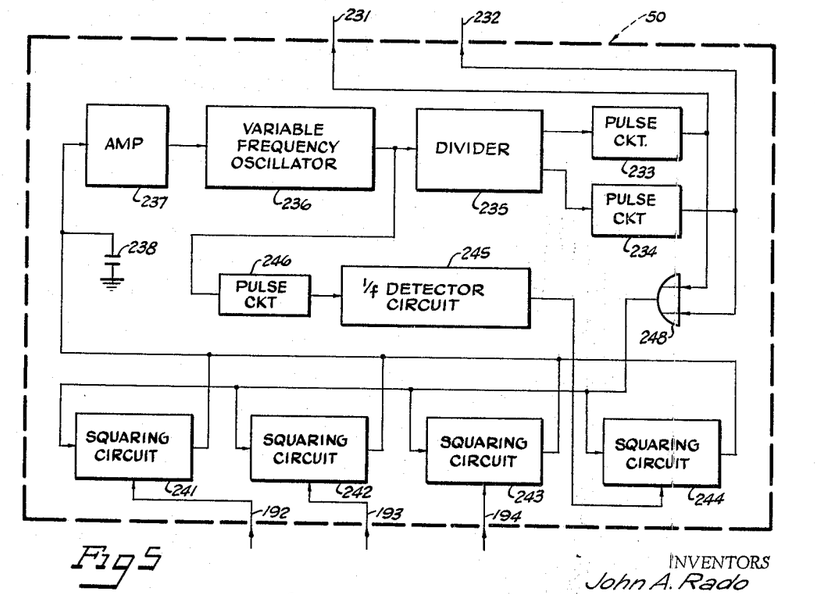
FIGURE 5 is a block diagram of a variable frequency reference signal generator of the system of FIGURE 1.

FIGURE 5 is a block diagram of the variable frequency reference signal generator 50 which responds to the normalized analog signals applied on lines 192, 193 and 194 to generate reference signals on a pair of output lines 231 and 232 at a frequency equal to a fixed value divided by the square root of the sum of the squares of the three normalized analog signals. The signals on lines 231 and 232 are of pulse form, 180° out of phase, and preferably have a frequency varying from a maximum value of about 16.6 kc., when two of the analog signals have a zero value, down to a frequency of about 9.64 kc. when the three analog signals have the same value.

The output lines 231 and 232 are connected to the outputs of a pair of pulse forming circuits 233 and 234 the inputs of which are connected to the output of a decade counter or frequency divider 235. The last stage of the divider 235 preferably is in the form of a flip-flop having a set output connected to pulse circuit 233 and a reset output connected to pulse circuit 234, to provide a 180° phase relation. The input of the divider 235 is connected to a variable frequency oscillator 236 having a frequency controlled by a voltage applied from an amplifier 237. The output frequency of oscillator 236 may preferably vary from 166 kc., when two of the analog signals have a zero value, down to 96.4 kc. when all three analog signals have the same value.

The input of the amplifier 237 is connected to ground through a capacitor 238 and to the outputs of four squaring circuits 241, 242, 243 and 244. The capacitor 238 forms a summing circuit.

The first three squaring circuits 241-243 are respectively connected to the input lines 192-194 while the fourth squaring circuit 244 is connected to the output of a special detector circuit 245 responsive to pulses from a pulse forming circuit 246 connected to the output of the variable frequency oscillator 236. The detector circuit 245 develops a signal inversely proportional to the output frequency of the variable frequency oscillator 236. This inverse frequency signal is squared by the circuit 244 and is applied to the summing capacitor 238 in opposition to the outputs of the squaring circuits 241-243, in a manner as described hereinbelow. This arrangement is highly advantageous in that by using the squaring circuit in a feedback path, it is not necessary to provide a square root circuit, and the operation is highly stable, reliable and accurate.

Each of the squaring circuits preferably comprises a monostable multivibrator as discussed hereinbelow in connection with FIGURE 6, which could be triggered at any desirable rate. Preferably, however, the multivibrators of the circuits 241–244 are triggered in synchronism with the output of the oscillator 236 from a line 247 connected to the output of an OR circuit 248 connected to the outputs of both pulse forming circuits 233 and 234. The circuits 241–244 are thereby triggered at a rate ranging from 33.2 kc. down to 19.28 kc. With this synchronized operation, greater stabiilty is obtained and it is not necessary to use a separate triggering signal source.

Figure 6:
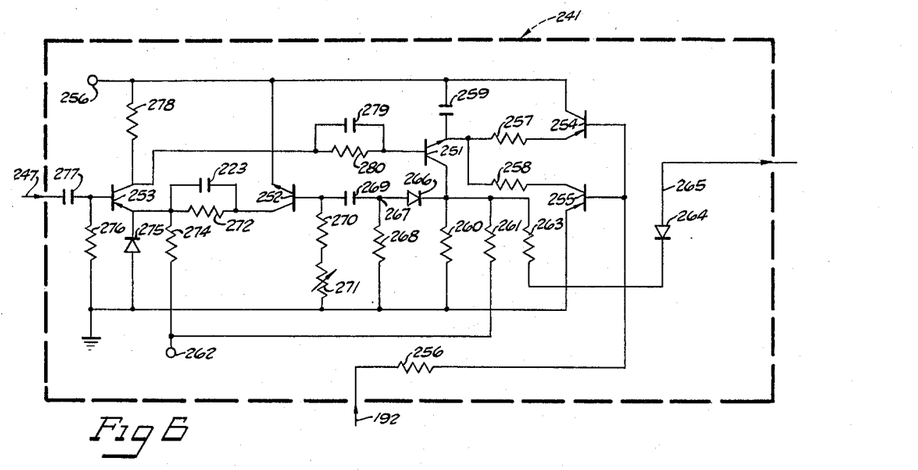
FIGURE 6 is a circuit diagram of a squaring circuit of the generator of FIGURE 5.

FIGURE 6 shows the circuit of the squaring circuit 241. The circuits 242–244 are the same as the circuit 241 except that the transistors, diodes and applied voltages of the circuit 244 are of opposite conductivity types and opposite polarity with respect to the circuits 241–243, so that the output of circuit 244 opposes the outputs of the circuits 241–243.

The squaring circuit 241 as shown in FIGURE 6 comprises transistors 251 and 252 forming a monostable multivibrator, a triggering pulse amplifying transistor 253 and a pair of transistors 254 and 255 in a clamp follower circuit which controls both the duration and the amplitude of output pulses in proportion to the input voltage, whereby the average or integrated value of the output pulses is proportional to the square of the input voltage.

In particular, the input voltage from line 192 is applied through a resistor 256 to the base electrodes of the transistors 254 and 255 which are of opposite conductivity types, the collector of the transistor 254 being connected to a negative power supply terminal 256 and the collector of the transistor 255 being grounded. The emitters of the transistors 254 and 255 are connected through resistors 257 and 258 to the emitter of the transistor 251 which is connected through a capacitor 259 to the power supply terminal 256. With this arrangement, the capacitor 259 is charged to a value corresponding to the value of the input voltage on line 192, the capacitor 259 being charged in one direction through the transistor 254 and in the opposite direction through the transistor 255.

The collector of the transistor 251 is connected through a resistor 260 to ground, through a resistor 261 to a positive power supply terminal 262, and through a resistor 263 and a diode 264 to an output line 265. The collector of the transistor 251 is also connected through a diode 266 to a circuit point 267 which is connected through a resistor 268 to ground and is also connected through a capacitor 269 to the base of the transistor 252, connected through a resistor 270 and a variable resistor 271 to ground.

The emitter of the transistor 252 is connected to the negative power supply terminal 256 while the collector thereof is connected through the parallel combination of a resistor 272 and a capacitor 273 to the emitter of the transistor 253 which is connected through a resistor 274 to the positive power supply termnial 262 and through a diode 275 to ground. The base of the transistor 253 is connected through a resistor 276 to ground and through a capacitor 277 to the triggering pulse input line 247.

In operation, the transistor 251 is normally nonconductive and the transistor 252 is normally conductive. When a negative triggering pulse is applied through capacitor 277 to the base of the transistor 253, a positive pulse is applied from the collector of transistor 253 to the base of transistor 251 to initiate conduction of the transistor 251. The potential of the collector of transistor 251 then moves to a negative value determined by the charge of capacitor 259 and the transistor 252 is cut off. After a certain time interval, the capacitor 269 discharges through the resistor 270 and variable resistor 271 to a point at which transistor 252 again conducts and through the coupling between the collector of transistor 252 and the emitter of transistor 253, the transistor 253 is cut off to cut off conduction of the transistor 251.

A negative pulse is thus developed at the collector 251 having an amplitude determined by the voltage across capacitor 259. The duration of the pulse is also determined by its amplitude because of the effect thereof on the bias of the timing circuit which includes capacitor 269 and resistors 270 and 271.

Thus pulses are developed at the collector of transistor 251 having an average value which is a function of the square of the input voltage on line 192. Such pulses are applied through the resistor 263 and the diode 264 to the output line 265 to the summing capacitor 238.

Figure 7:
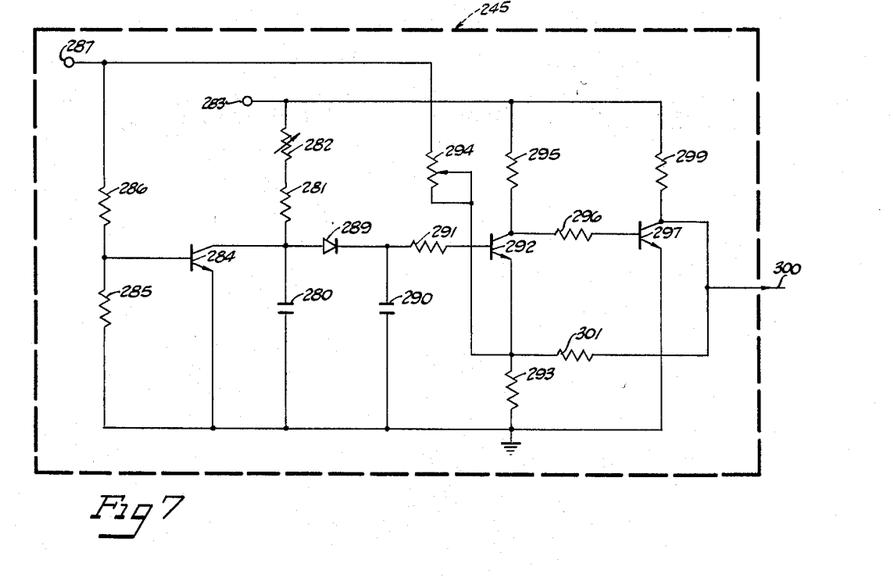
FIGURE 7 is a circuit diagram of an inverse frequency detector circuit of the generator of FIGURE 5.

FIGURE 7 shows the circuit of the 1/f detector 245 which develops an analog output signal inversely proportional to the frequency of pulses applied thereto from the variable frequency oscillator through the pulse forming circuit 246. In this circuit, a capacitor 280 has one terminal connected to ground and its other terminal connected through a fixed resistor 281 and a variable resistor 282 to a positive power supply terminal 283, the capacitor 280 being thus charged up at a rate determined by the time constant of the circuit. The capacitor 280 is periodically discharged by a transistor 284 having its collector connected to the ungrounded terminal of capacitor 280 and having its emitter grounded. The base of transistor 284 is connected to the output of pulse circuit 246 and is also connected through a resistor 285 to ground and through a resistor 286 to a negative power supply terminal 287. With this circuit, a sawtooth signal is developed at the ungrounded terminal of capacitor 280 which has a peak value inversely proportional to the frequency of the input signal. This sawtooth signal is applied to a peak detector comprising a diode 289 and a capacitor 290, a signal being developed across capacitor 290 substantially equal to the peak value of the sawtooth voltage. This voltage is applied through resistor 291 to the base of a transistor 292 having its emitter connected through a resistor 293 to ground and through a variable resistor 294 to the negative power supply terminal 287. The collector of transistor 292 is connected through a resistor 295 to the positive power supply terminal 283 and through a resistor 296 to the base of a transistor 297. The emitter of transistor 297 is connected through a resistor 298 to ground, while the collector thereof is connected through a resistor 299 to the positive power supply terminal 283 and is also connected to an output line 300. A resistor 301 is connected between the output line 300 and the emitter of the transistor 292 to provide a feedback circuit.

With this circuit, a D.C. voltage is developed on the output line 300 proportional to the output of the peak detector which, in turn, is inversely proportional to the frequency of the input signal.

Figure 8:
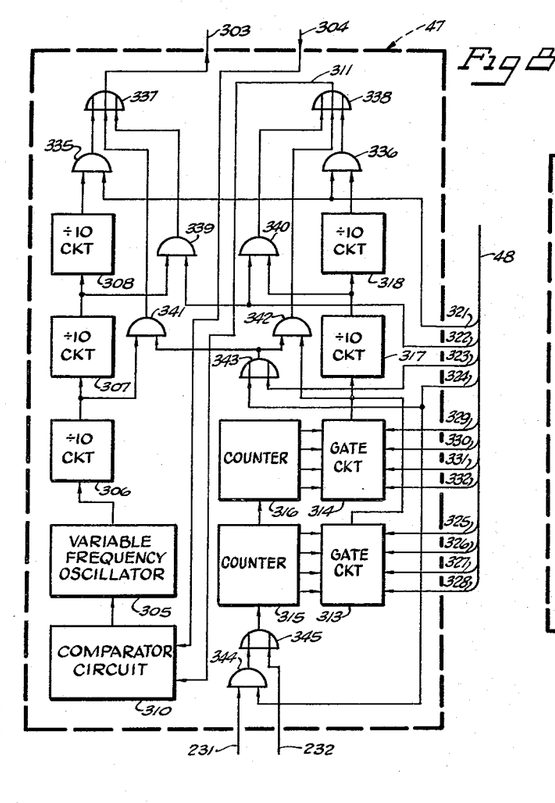
FIGURE 8 is a block diagram of a variable frequency control signal generator of the system of FIGURE 1.

FIGURE 8 shows the circuit of the variable frequency control signal generator 47 which develops an output signal on a line 303, connected to the gate 46, at a frequency such that the frequency of the largest axis signal from circuit 49, applied on a line 304, is equal to the frequency of the signal applied on lines 231 and 232 from the reference signal generator 50, multiplied by a feedrate number applied through a cable 48 from the data distributor and storage system 25.

The output signal on line 303 is developed from a variable frequency oscillator 305 through a divide-by-ten circuit 306, and in some cases through one or both of two additional divide-by-ten circuits 307 and 308. Oscillator 305 is controlled from a comparator circuit 310 which responds to the largest axis pulse signal applied on line 304 and to a feedrate command signal on line 311. The comparator circuit 310 so controls the oscillator 305 as to maintain the signals on lines 304 and 311 at the same frequency.

The feedrate command signal on line 311 is developed from the signals applied on lines 231 and 232 through a pair of gate circuits 313 and 314 operated from decade counters 315 and 316, the gate circuits 313 and 314 and the decade counters 315 and 316 together forming a fractional multiplier. In some cases, one or both of a pair of divide-by-ten circuits 317 and 318 may be used in developing the feedrate command signal on line 311.

The illustrated system is designed for use with a three digit command signal wherein one of a first group of four lines 321–324 of the cable 48 may be energized in accordance with a first digit, one or more of a second group of four lines 325–328 may be energized in accordance with a second digit and one or more of a third group of four lines 329–332 may be energized in accordance with a third digit.

By way of example, the line 321 may be energized when the programmed feedrate is in the range from 0.1 to 0.99 inch per minute; the line 322 may be energized when the programmed feedrate is in the range from 1 to 9.9 inches per minute; the line 323 may be energized when the programmed feedrate is in the range from 10 to 99 inches per minute; and the line 324 may be energized when the programmed feedrate is in the range from 100 to 200 inches per minute, 200 inches inches per minute being a maximum speed for the illustrated system. Lines 325–328 for the second digit and lines 329–332 for the third digit may preferably be energized in accordance with a 5,2,1,1 code. Thus if a feedrate of 47 inches per minute were programmed, the line 323 of the first group would be energized, lines 326, 327 and 328 of the second group would be energized, and lines 329 and 330 of the third group would be energized. With a 5,2,1,1 code being used, each of the counters 315 and 316 is arranged to generate in response to each ten input pulses, five pulses on one line, two pulses on a second line, one pulse on a third line and one pulse on a fourth line with the pulses on each line being non-coincident with the pulses on each of the other lies.

Line 321 of the first group controls a pair of AND gates 335 and 336 conected between the outputs of divide-by-ten circuits 308 and 318 and a pair of OR gates 337 and 338 connected to lines 303 and 311 respectively, so that the signals on lines 303 and 311 have frequencies respectively equal to the frequency of the output of the divide-by-ten circuit 306 and the gate circuits 313, 314, divided by 100. Line 322 controls a second pair of AND gates connected between the outputs of the divide-by-ten circuits 307 and 317 and OR gates 337 and 338. Line 323 controls a third pair of AND gates 341 and 342, through an OR gate 43, to connect the output of the divide-by-ten circuit 306 and the outputs of the gate circuits 313 and 314 to the lines 303 and 311. The gates 341 and 342 are also controlled from the line 324, through the OR gate 343 and in addition, the line 324 controls an AND gate 344 to connect the input line 231 to the input of counter 315 through an OR gate 345, line 232 being connected to a second input of the OR gate 345. Since as described above, pulses of the same frequency but in 180° phase relation are developed on the lines 231 and 232, pulses at double the frequency are applied to counter 315 when gate 344 is enabled by a signal on line 324.

With this circuit arrangement, an extremely wide range of output frequency is obtained with a comparatively narrow range of operation of the variable frequency oscillator 305 and a narrow range of frequency is applied to input lines 231 and 232. By way of example, the output frequency on line 303 may be in a range from 9.5 cycles to 328 kc. while the oscillator 305 is operated in a range from 9.5 kc. to 3280 kc. At the same time, the frequency on lines 304 and 311 may vary from 9.5 cycles to 33.2 kc.

It may here be noted that the oscillator 305 is preferably a beat frequency oscillator, including fixed and variable frequency oscillators connected through buffers to a mixer having an output applied through a low pass filter and amplifiers to a monostable multivibrator operating as a pulse generator. The oscillator 236 of the circuit 50 is preferably a similar type of beat frequency oscillator.

Figure 9:
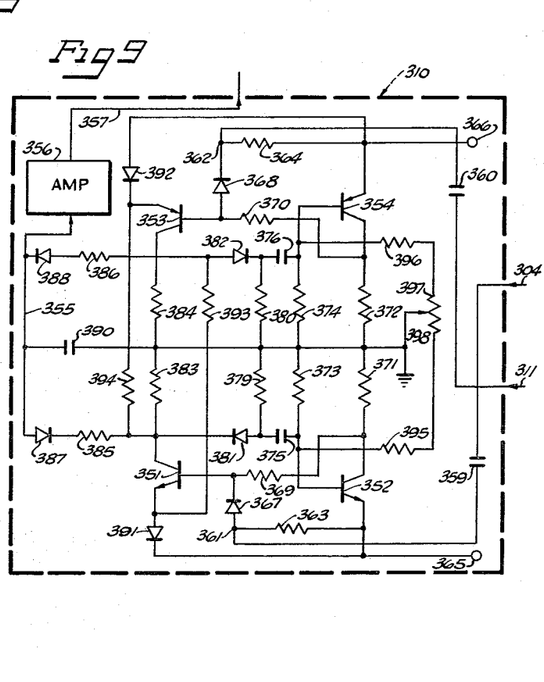
FIGURE 9 is a circuit diagram of a comparator circuit of the generator of FIGURE 8.

FIGURE 9 shows the circuit of the frequency comparator circuit 310 which develops a D.C. output signal varying in magnitude and polarity in accordance with the difference in frequency between the largest axis signal on line 304 and the feedrate command signal on line 311, the D.C. output signal being used to control the variable frequency oscillator 305.

The comparator circuit 310 comprises a first monostable multivibrator including a pair of transistors 351 and 352 triggered in response to the largest axis signal on line 304 and a second monostable multivibrator including a pair of transistors 353 and 354 triggered in response to the feedrate command signal on line 311. The transistors 351 and 352 of the first multivibrator are of types having conductive characteristics opposite to the types of the transistors 353 and 354 and the pulses developed by the multivibrators are applied in opposition and are integrated to produce a voltage on a line 355 which is applied to an amplifier 356 having an output connected through an output line 357 to the variable frequency oscillator 305.

With the pulses developed by the two multivibrators being of the same duration and amplitude, the integrated difference value corresponds in phase and magnitude to the difference between the rates at which the two multivibrators are triggered, and a sensitive, stable and accurate indication of frequency deviation is obtained. An important advantage of the circuit is that it is operative over a wide range of frequencies and for example, it can operate over a frequency range from 9.5 cycles to 33.2 kc., or over a frequency range of about 3500 to 1.

With regard to the details of the circuits, the input lines 304 and 311 are connected through capacitors 359 and 360 to circuit points 361 and 362 which are connected through resistors 363 and 364 to power supply terminals 365 and 366, at negative and positive potentials respectively, preferably −20 and +20 volts. Circuit points 361 and 362 are also connected through diodes 367 and 368 to the base electrodes of transistors 351 and 353 which are connected through resistors 369 and 370 to the collectors of the transistors 352 and 354 which are connected through resistors 371 and 372 to ground. The base electrodes of transistors 352 and 354 are connected through resistors 373 and 374 to ground and through capacitors 375 and 376 to circuit points 377 and 378 which are connected through resistors 379 and 380 to ground. Circuit points 377 and 378 are connected through diodes 381 and 382 to the collectors of transistors 351 and 353 which are connected through resistors 383 and 384 to ground and also through resistors 385 and 386 and diodes 387 and 388 to the line 355. A capacitor 390 is connected between the line 355 and ground and preferably has a relatively large value, on the order of one microfarad, to permit operation at extremely low frequencies, preferably down to 9 cycles.

The emitters of the transistors 351 and 353 are connected through diodes 391 and 392 to the terminals 365 and 366 and are also connected through resistors 393 and 394 to the collectors of the transistors 351 and 353, respectively.

In operation, the transistors 351 and 353 are normally cut off while the transistors 352 and 354 are conductive. A positive pulse applied to the input terminal 304 initiates conduction of the transistor 351 and the transistor 352 is cut off through the coupling from the collector of transistor 351 through the diode 381 and the capacitor 375 to the base of the transistor 352, and the transistor 351 is rendered conductive through the coupling from the base thereof to the collector of transistor 352 through the resistor 369. After a certain time interval, the charge of the capacitor 375 is changed to an extent such that the transistor 352 again begins to conduct, whereupon transistor 351 is again cut off. Thus a negative pulse is developed at the collector of transistor 351 of a certain amplitude and duration, in response to each triggering pulse on line 304. Such negative pulses are applied through resistor 385 and diode 387 to the line 355 to change the charge of the capacitor 390 in a negative direction. The operation of the second multivibrator is the same except that the polarities are reversed, with negative triggering pulses being applied on line 311 and with positive output pulses being developed at the collector of transistor 353 and being applied through resistor 386 and diode 388 to change the charge of the capacitor in a positive direction. Thus if the rate of operation of the first multivibrator is greater than that of the second multivibrator, a negative voltage is developed on the line 355 while if the operation of the second multivibrator is greater than that of the first multivibrator, a positive voltage is developed on the line 355.

Figure 10:
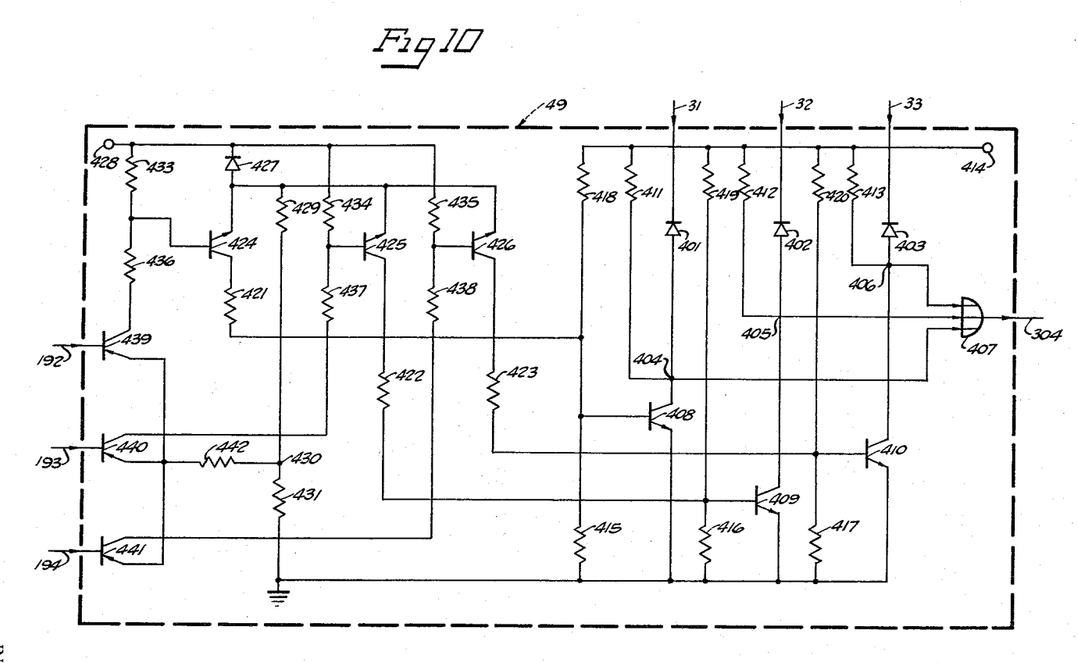
FIGURE 10 is a circuit diagram of a largest axis gate circuit of the system of FIGURE 1.

FIGURE 10 illustrates the arrangement of the largest axis gate circuit 49. This circuit functions to apply command pulses from one of the three $x$, $y$ and $z$ lines 31, 32 or 33 in accordance with the axis for which the largest incremental movement is programmed, and hence the axis for which the command pulses are generated at the most rapid rate, control signals being applied from the lines 192, 193 and 194, connected to the outputs of the digital-analog convertors 51–55 through the diodes 195 as shown in FIGURE 1.

In particular, the lines 31–33 are respectively connected through diodes 401–403 to circuit points 404–406 which are connected through an OR gate 407 to the output line 304 which is connected to one input of the comparator circuit 310. The circuit points 404–406 are also connected to the collectors of transistors 408–410 and through resistors 411–413 to a positive power supply terminal 414. The emitters of the transistors 408–410 are connected directly to ground while the base electrodes thereof are connected through resistors 415–417 to ground, through resistors 418–420 to the positive power supply terminal 414 and through resistors 421–423 to the collectors of transistors 424–426. The emitters of the transistors 424–426 are connected together and through a diode 427 to a negative power supply terminal 428 and are also connected through a common resistor 429 to a circuit point 430 connected through a resistor 431 to ground. The base electrodes of the transistors 424–426 are connected through resistors 433–435 to the negative power supply terminal 428 and are also connected through resistors 436–438 to the collectors of transistors 439–441. The emitters of the transistors 439–441 are connected together and through a resistor 442 to the circuit point 430 while the base electrodes thereof are connected to the input lines 192–194.

In operation, one of the lines 192, 193 or 194 will have a voltage more negative than the other two lines, to establish a certain negative potential at the common connection of the emitters of the transistors 439–441, to thus prevent conduction of the other two transistors. The collector of the one of the three transistors 439–441 which is conducting will be at a potential approaching that of the emitter thereof which will be positive relative to the potentials of the collectors of the non-conductive transistors, the potentials of the collectors of such non-conductive transistors being approximately equal to that of the negative power supply terminal 428. As a result, a positive signal will be applied to the base electrode of one of the three transistors 424–426 to render it conductive, while the other two transistors will be cut off.

The conduction of one of the transistors 424–426 will apply a negative voltage to the base electrode of one of the three transistors 408–410 to render it non-conductive, to thus permit application of pulses from one of the three circuit points 404–406 through the gate 407 to the output line 304. The other two of the transistors 408–410, being conductive, will clamp the potential of the collectors thereof at a value close to ground potential.

Accordingly, command pulses will be applied from one of the three lines 31–33 to the output line 304, in accordance with the largest axis signal applied on one of the lines 192–194.

It will be understood that modifications and variations may be effected without departing from the spirit and scope of the novel concepts of the present invention.

I claim as my invention:

1. In a system for effecting movement of parts along mutually perpendicular axes,
   data storage means for storing coded signals correspondingly to plural digit decimal numbers respectively representing desired movements of said parts along said axes,
   a plurality of decade counters connected in cascade and each arranged to develop a series of pulses,
   a plurality of command pulse output lines respectively corresponding to said axes,
   gate means controlled from said data storage means for applying said series of pulses from said decade counters to said output lines in accordance with said stored coded signals,
   means for generating a control pulse train,
   means for normally applying said control pulse train to the input of the first of said cascade-connected decade counters,
   means responsive to a stored zero as a first digit in all axes for applying said control pulse train to the input of the second of said cascade-connected decade counters,
   means responsive to a stored zero as the first and second digits in all axes for applying said control pulse train to the input of the third of said cascade-connected decade counters,
   and means responsive to a stored zero as first, second and third digits in all axes for applying said control pulse train to the input of the fourth of said cascade-connected decade counters.

2. In a system for effecting movement of parts along mutually perpendicular axes,
   oscillator means for generating a variable frequency control signal,
   command pulse generating means responsive to said control signal for generating a plurality of trains of command pulses respectively corresponding to said axes,
   means responsive to said trains of command pulses for developing an output signal at a rate proportional to the rate of one of said trains,
   means for developing a feedrate command signal at a certain rate,
   a frequency comparator including first and second monostable multivibrator means respectively triggered in response to said output signal and said feedrate command signal to develop output pulses having certain amplitudes and durations,
   an integrating circuit,
   means for applying said output pulses in opposition to said integrating circuit,
   and means responsive to the output of said integrating circuit for controlling said oscillator means to maintain the rate of said output signal equal to the rate of said feedrate command signal.

References Cited by the Examiner

UNITED STATES PATENTS

| | | |
|---|---|---|
| 2,784,359 | 3/1957 | Kamm __________ 235—151.11 |
| 2,927,735 | 3/1960 | Scuitto __________ 235—151.11 |
| 3,063,311 | 11/1962 | Beckwith et al. |
| 3,099,781 | 7/1963 | Herchenroeder ____ 235—151.11 |
| 3,109,974 | 11/1963 | Hallmark. |
| 3,110,865 | 11/1963 | Scuitto. |
| 3,122,691 | 2/1964 | Centner et al. |
| 3,204,132 | 8/1965 | Benaglio et al. _______ 318—28 |

MALCOLM A. MORRISON, *Primary Examiner.*

I. KESCHNER, *Assistant Examiner.*

UNITED STATES PATENT OFFICE
CERTIFICATE OF CORRECTION

Patent No. 3,286,085                      November 15, 1966

John A. Rado

It is certified that error appears in the above identified patent and that said Letters Patent are hereby corrected as shown below:

In the heading to the printed specification, line 4, "assignor to TWR Inc., a corporation of Ohio" should read -- assignor, by mesne assignments, to The Bunker-Ramo Corporation, Stamford, Conn., a corporation of Delaware --.

Signed and sealed this 30th day of December 1969.

(SEAL)
Attest:

Edward M. Fletcher, Jr.                 WILLIAM E. SCHUYLER, JR.
Attesting Officer                          Commissioner of Patents